United States Patent
Peterson

(10) Patent No.: US 7,918,472 B2
(45) Date of Patent: Apr. 5, 2011

(54) DUAL-LEVER COMPRESSION SUSPENSION SYSTEM

(75) Inventor: Kris Devin Peterson, Central Point, OR (US)

(73) Assignee: Dual Lever Suspension, LLC, Medford, OR (US)

( * ) Notice: Subject to any disclaimer, the term of this patent is extended or adjusted under 35 U.S.C. 154(b) by 0 days.

(21) Appl. No.: 12/761,380

(22) Filed: Apr. 15, 2010

(65) Prior Publication Data

US 2010/0264623 A1 Oct. 21, 2010

Related U.S. Application Data

(60) Provisional application No. 61/212,672, filed on Apr. 15, 2009.

(51) Int. Cl.
*B62K 7/02* (2006.01)
(52) U.S. Cl. ............ 280/283; 280/281.1; 280/275; 280/124.135; 280/124.15; 280/788; 180/235
(58) Field of Classification Search ............ 280/281.1, 280/283, 284, 286, 275, 124.135, 124.136, 280/124.138, 124.141, 124.15, 788; 180/235
See application file for complete search history.

(56) References Cited

U.S. PATENT DOCUMENTS

| | | | |
|---|---|---|---|
| 944,795 A * | 12/1909 | Leet et al. ............ 280/284 |
| 4,623,162 A | 11/1986 | Weitzenhof et al. |
| 5,382,034 A | 1/1995 | Parker et al. |
| 5,553,881 A | 9/1996 | Klasen et al. |
| 5,628,524 A | 5/1997 | Klassen et al. |
| 5,716,042 A | 2/1998 | Derviller |
| 6,003,885 A | 12/1999 | Richardson |
| 6,206,397 B1 | 3/2001 | Klassen et al. |
| 6,488,301 B2 | 12/2002 | Klassen et al. |
| RE39,159 E | 7/2006 | Klassen et al. |
| 7,581,743 B2 | 9/2009 | Graney |
| 7,802,800 B2 * | 9/2010 | Melcher ............ 280/5.509 |
| 2005/0046144 A1* | 3/2005 | Chamberlain et al. ........ 280/284 |

(Continued)

*Primary Examiner* — Joanne Silbermann
*Assistant Examiner* — Tashiana Adams
(74) *Attorney, Agent, or Firm* — Silicon Forest Patent Group; Paul J Fordenbacher, Esq

(57) ABSTRACT

A dual-lever compression system comprising a shock absorber, a first lever, and a second lever. The shock absorber first end is pivotally coupled to a frame. The shock absorber second end is pivotally coupled to a first lever first end and the first lever second end is coupled to the frame. The second lever first end is pivotally coupled to the shock absorber second end and the second lever second end is coupled to a swing-arm. The compression performance control provided by embodiments of the dual-lever compression system is directly related to the incorporation of dual levers coupled to the shock absorber; that is, the first lever and the second lever. Angles, position, and pivotal rotations of the dual levers provide for controlled shock absorption. Compression performance of two connecting points between the rigid frame regions where by a first lever pivotally couples to one point of a rigid frame and pivotally couples to the impact point of the shock absorber, with the base mount of the shock absorber pivotally coupled to a second point of the rigid frame. The second lever completes the system, where a first end of the second lever is pivotally coupled to the first lever or the shock absorber impact point. A second end of the second lever is pivotally coupled to a swing-arm or wheel region. The dual lever assembly manipulates the shock absorber force tension which in return produces increased suspension performance.

15 Claims, 7 Drawing Sheets

U.S. PATENT DOCUMENTS

| | | |
|---|---|---|
| 2006/0017240 A1 | 1/2006 | Laurent |
| 2006/0061059 A1* | 3/2006 | Lesage et al. ............. 280/284 |
| 2007/0108725 A1 | 5/2007 | Graney |
| 2008/0258415 A1 | 10/2008 | Melcher |
| 2009/0278331 A1 | 11/2009 | Graney |
| 2010/0102531 A1 | 4/2010 | Graney et al. |

* cited by examiner

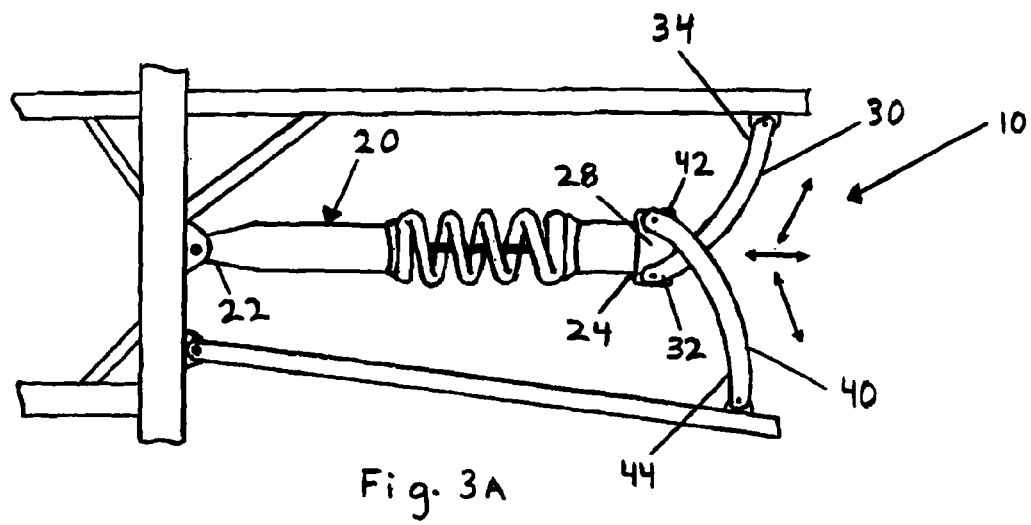
Fig. 3A
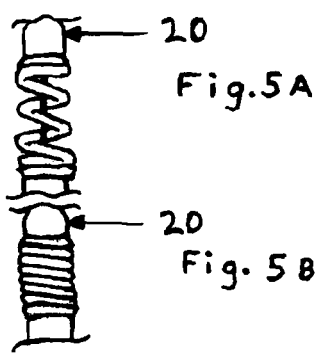
Fig. 5A
Fig. 5B
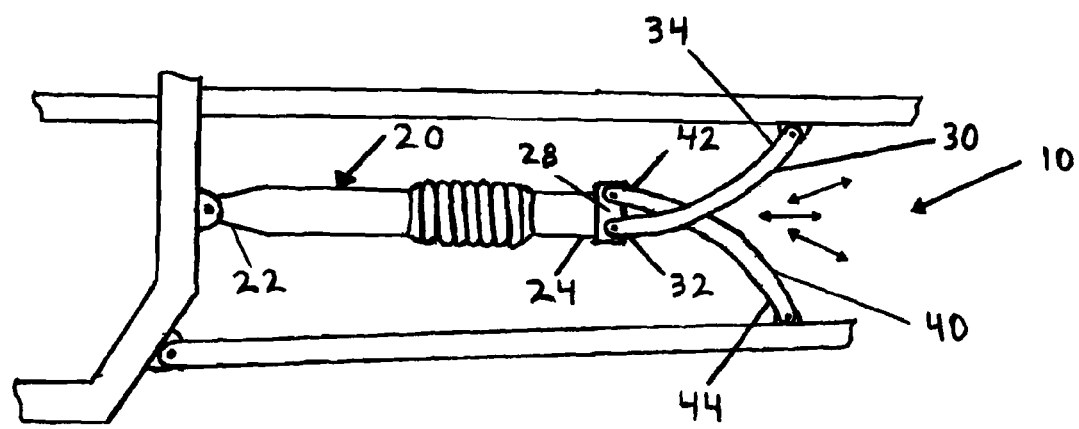
Fig. 3B

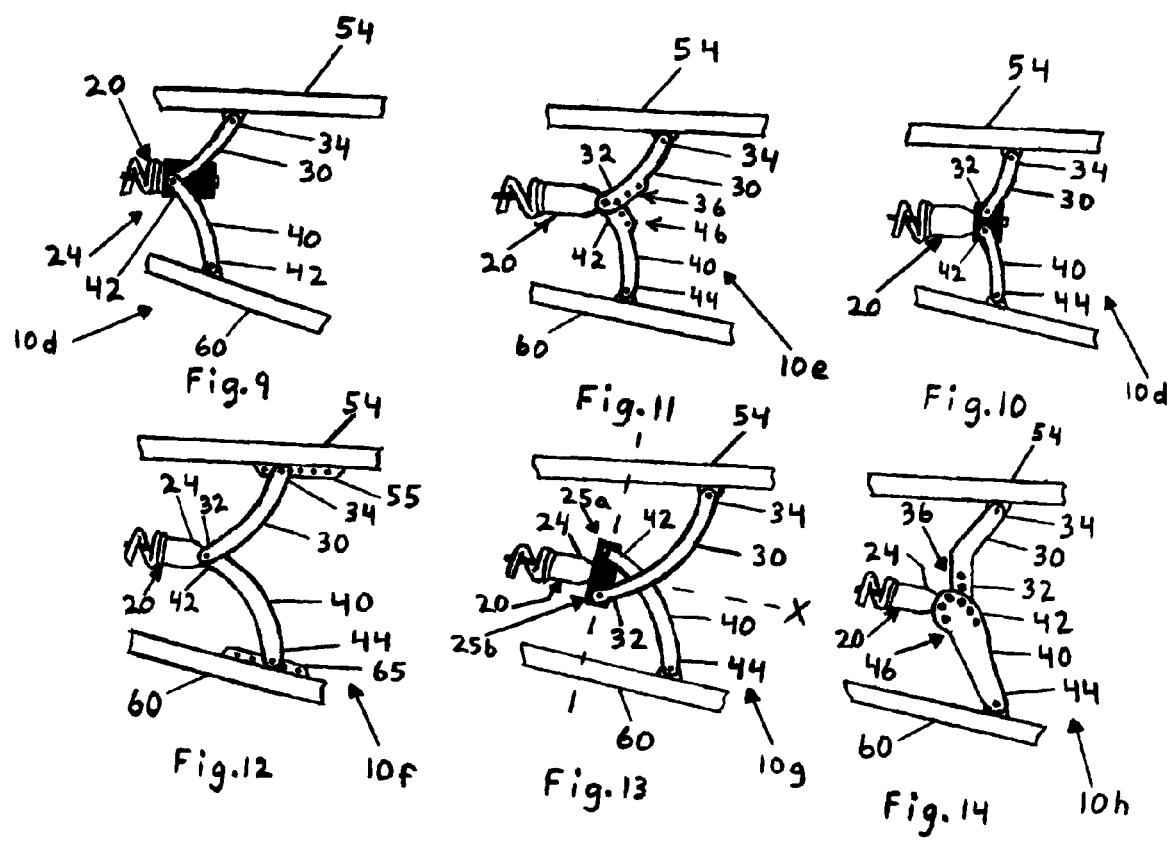

DUAL-LEVER COMPRESSION SUSPENSION SYSTEM

FIELD

The embodiments presented herein are generally related to suspension systems.

BACKGROUND

In suspension systems that have a coil spring shock absorber coupled directly to a frame on one end and coupled to a wheel or swing-arm on the opposite end, herein referred to as a direct impact shock system, the response of the shock absorber is not linear over the range of travel of the shock absorber. At the beginning of compression, the shock absorber exhibits a lag in response to an impact which presents undesirable performance characteristics such as spongy or imprecise control of damping response. As the coil nears or reaches full compression, the shock absorber exhibits undesirable kickback which causes motion instabilities and jarring. At full compression, the shock absorber is no longer able to respond to greater impact loads leading to loss of damping performance. In other words, the response of coil shock absorbers to loading and impact is non-linear over the range of compression, otherwise known as the shock absorber travel, of the coil spring. Therefore, the desired performance of the direct impact shock system may be presented when the shock absorber is within a narrow range between the fully extended and fully compressed, referred to as the "sweet spot". In force loading situations where the shock absorber travel is large, it is likely that the shock absorber will travel outside this sweet spot of desired performance and into the realm of poor performance.

The coil spring shock absorber is not the only device that exhibits the above described non-linear response. Such a response may be found in other shock absorber systems, including, but not limited to, gas and hydraulic-type shock absorbers and combinations of which that include a coil spring.

Accordingly, there is a need in the art for improved apparatus and methods for suspension systems.

BRIEF DESCRIPTION OF THE DRAWINGS

Non-limiting and non-exhaustive embodiments will be described with reference to the following figures, wherein like reference numerals refer to like parts throughout the various figures unless otherwise specified.

FIGS. 3A and 3B are side views of a dual-lever compression system in accordance with an embodiment;

FIGS. 5A and 5B are side views of a shock absorber as is known in the art;

FIG. 9 is a side view of another dual-lever compression system in accordance with an embodiment;

FIG. 10 is a side view of another dual-lever compression system in accordance with an embodiment;

FIG. 11 is a side view of another dual-lever compression system in accordance with an embodiment;

FIG. 12 is a side view of another dual-lever compression system in accordance with an embodiment;

FIG. 13 is a side view of another dual-lever compression system in accordance with an embodiment;

FIG. 14 is a side view of another dual-lever compression system in accordance with an embodiment;

DETAILED DESCRIPTION

Figure 1:
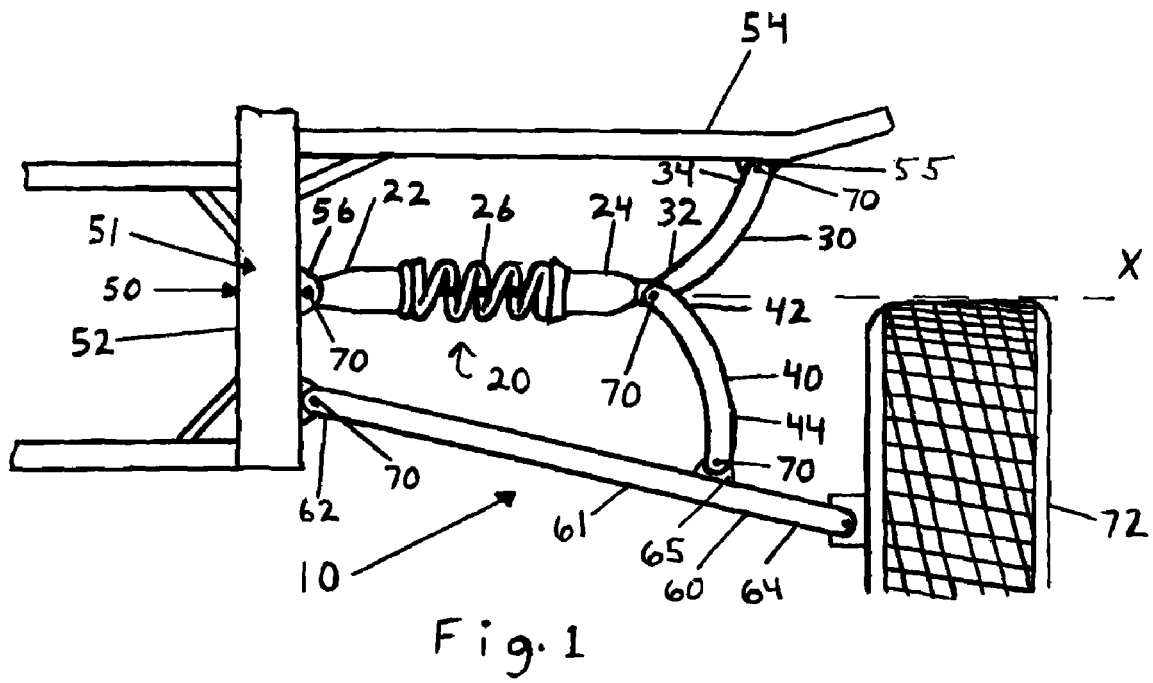
FIG. 1 is a side view of a dual-lever compression system in accordance with an embodiment.

Reference throughout this specification to "one embodiment" or "an embodiment" means that a particular feature, structure, or characteristic described in connection with the embodiment is included in at least one embodiment of claimed subject matter. Thus, the appearances of the phrase "in one embodiment" or "an embodiment" in various places throughout this specification are not necessarily all referring to the same embodiment. Furthermore, the particular features, structures, or characteristics may be combined in one or more embodiments.

Reference will now be made to embodiments illustrated in the drawings and specific language which will be used to describe the same. It will nevertheless be understood that no limitation of the scope of the invention is thereby intended. Alterations and further modifications of the illustrated embodiments and further applications of the principles of the invention, as would normally occur to one skilled in the art to which the invention relates, are also within the scope of the invention.

In the description below, reference is made to a vehicle suspension system, also referred herein as a compression system, for convenience of explanation of the application of the principles of the embodiments. It is appreciated that the same principles may be used in any suitable application, in addition to vehicles, where suspension systems are desired. Such applications include, but are not limited to, vibration and impact isolation of machinery and seating.

In the description below, reference is made to a frame. The frame generally refers to that part of a structure where isolation from shock and vibration is desired. An example includes, but is not limited to, a vehicle frame.

In the description below, reference is made to a loading structure. A loading structure generally refers to that structure which receives shock, vibration, or other type of movement relative to the frame. Examples of loading structure include, but are not limited to, vehicle wheels and swing-arms; swing-arms, such as, but is not limited to, structure that couples a wheel to a frame. In general, the suspension system, also referred herein as a compression system, is coupled between the frame and the loading structure and is operable to, at least in part, at least partially isolate from the frame, the impact, vibratory, and/or other type of loading directed on the loading structure. Suspension travel generally refers to the distance that the free end of the loading structure moves relative to the frame.

FIG. 1 is a side view of a dual-lever compression system 10 in accordance with an embodiment. The dual-lever compression system 10 comprises a compression shock absorber 20, a first lever 30, and a second lever 40. The compression shock absorber 20 includes a shock absorber first end 22 and a shock absorber second end 24 opposite the shock absorber first end 22. The shock absorber first end 22 is operable for pivotally coupling to a frame 50. The shock absorber second end 24 is operable for pivotally coupling to the first lever 30 and the second lever 40.

The compression shock absorber 20 includes a means for resilient shock absorption and recovery, such as, but not limited to, a coil spring, gas and hydraulic-type absorbers and combinations thereof. Although the compression means may comprise many types of shock absorbers, such as, but not limited to, coil spring, gas, hydraulic-type compression shock absorber systems, for simplicity of explanation, a coil spring shock absorber is shown and described. Substantially similar performance attributes are common among various types of shock absorbers. Shock absorber travel generally refers to the distance that the shock absorber compresses under load; that is, the change in length of the shock absorber.

The first lever 30 is an elongated element comprising a first lever first end 32 and a first lever second end 34 opposite the first lever first end 32. The second lever 40 is an elongated element comprising a second lever first end 42 and a second lever second end 44 opposite the second lever first end 42. Either of both of the first lever 30 and second lever 40 may be straight, arc-shaped, or otherwise non-straight, suitable for a particular purpose. The particular purpose for determining the desired shape of the first lever 30 and second lever 40 includes, but not limited to, the desired direction of force loading on the first lever 30 and second lever 40, control of direction of movement of the loading structure 61, and clearance of the various elements of the compression system and structure coupled thereto. In accordance with other embodiments wherein further structural strength is required, a pair of first levers 30 and a pair of second levers 40 may be used. It is appreciated that embodiments of the dual-lever compression system 10 may comprise one of each of the first lever 30 and second lever 40, a pair of first levers 30 and second levers 40, or one first lever 30 or second lever 40 and a pair of second levers 40 or first levers 30, respectively, or combinations of a plurality of first levers 30 and second levers 40.

In the embodiment of FIG. 1, the shock absorber first end 22 is pivotally coupled to a frame 50. The first lever first end 32 is pivotally coupled to the shock absorber second end 24 and the first lever second end 34 is pivotally coupled to the frame 50. The second lever first end 42 is pivotally coupled to the shock absorber second end 24 and the second lever second end 44 is pivotally coupled to a loading structure 61. The first lever 30 and the second lever 40 as coupled to the shock absorber 20 define generally a Y-shape.

In accordance with an embodiment, the shock absorber first end 22 is pivotally coupled to a vehicle frame 51 of a vehicle at a strategic point by means of a mounting bracket 56. The shock absorber first end 22 is coupled to the mounting bracket 56 with a pivot pin 70. The mounting bracket 56 may be permanently coupled to the vehicle frame 51. In the embodiment of FIG. 1, the shock absorber 20 is mounted at a generally horizontal orientation, although the shock absorber 20 may be mounted at any angle to the horizontal depending on the application. The shock absorber first end 22 may be coupled to a main frame 52 member of the vehicle. The first lever first end 32 and the second lever first end 42 are pivotally coupled to the shock absorber second end 24 via a pivot pin 70.

Although reference is made to the use of pivot pins for affecting a pivotal coupling, it is appreciated that any type of coupling element that is operable for affecting a pivotal coupling may be used.

The first lever 30 and second lever 40 are operable to pivot freely from the shock absorber second end 24. The first lever 30 is rotated upward and coupled to a fender mounting point 55 of a fender frame 54 of a vehicle, as shown in the embodiment of FIG. 1, in the illustrative example there shown. The second lever 40 is in like manner rotated downward and pivotally coupled at a swing-arm mounting point 65 on a swing arm 60.

Figure 2:
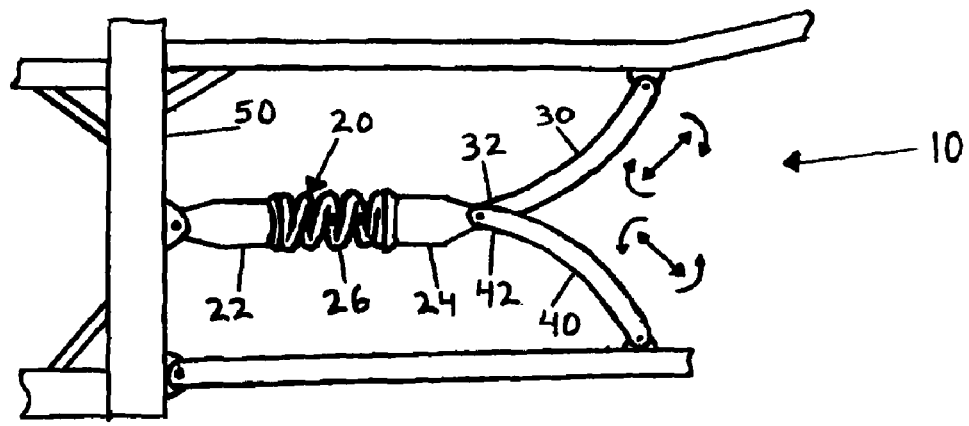
FIG. 2 is a side view of the dual-lever compression system in accordance with the embodiment of FIG. 1 showing the forces along the first and second levers.

The swing-arm 60 is pivotally coupled to the main frame 52 at a swing-arm first end 62 and coupled to a wheel 72 at a swing-arm second end 64 opposite the swing-arm first end 62. FIG. 2 is a side view of the dual-lever compression system 10 in accordance with the embodiment of FIG. 1 showing the movement of the first lever 30 and second lever 40 in a loading condition. Upon loading of the swing-arm 60 by a force, such as might be experienced by the wheel 72 travelling over a bump, the swing-arm coupling the wheel 72 to the vehicle frame 51 pivots upward toward the fender frame 54. The first lever 30 and second lever 40 are driven in angular rotation by which the first lever first end 32 and second lever first end 42 move toward the shock absorber 20 so as to compress the shock absorber 20. The details of these mechanical processes will be further discussed below.

FIGS. 3A and 3B are side views of a dual-lever compression system 10 in a relaxed and compressed condition, respectively, in accordance with another embodiment. An alternative coupling arrangement of the first lever first end 32 and the second lever first end 42 comprises a closed end sleeve cup 28 that slides over and engages the shock absorber second end 24. When inserted over the shock absorber second end 24, the sleeve cup 28 couples to the shock absorber second end 24. The first lever first end 32 and the second lever second end 44 may be coupled to various points on the sleeve cup 28. As shown in FIGS. 3A and 3B, the first lever first end 32 is coupled to the sleeve cup 28 at a position farthest away from the first lever second end 34, and the second lever first end 42 is coupled to the sleeve cup 28 at a position farthest away from the second lever second end 44, wherein the first lever 30 and second lever 40 cross over each other. This coupling system may provide optimum compression and lever clearance space in particular installations.

Figure 4:
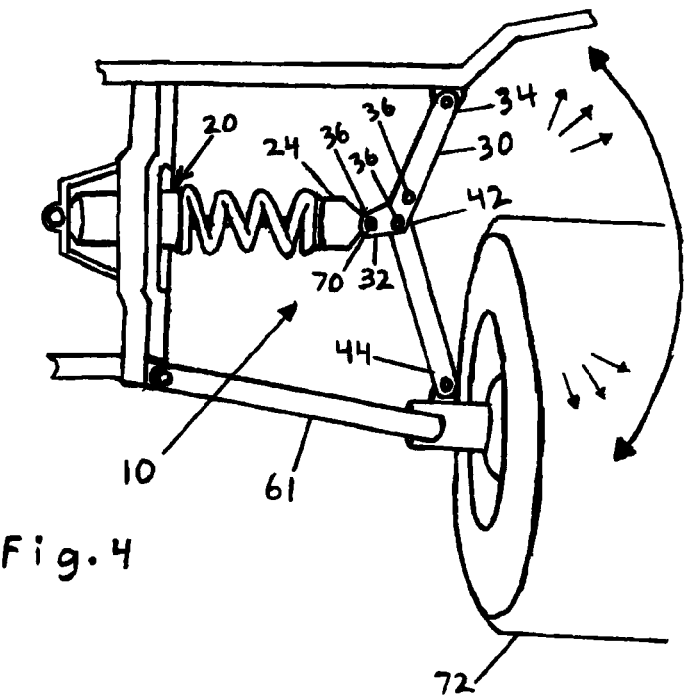
FIG. 4 is a side view of the dual-lever compression system in accordance with another embodiment.

FIG. 4 is a side view of the dual-lever compression system 10 in accordance with another embodiment. The first lever 30 comprises a plurality of first lever mounting points 36 along the length of the first lever 30 between the first lever first end 32 and the first lever second end 34 suitable for receiving a pivot pin 70 therethrough. The second lever first end 42 may couple at one of the first lever mounting points 36, as compared with coupling to the shock absorber second end 24 as shown in the embodiment of FIG. 1. The placement of the second lever first end 42 at a particular first lever mounting point 36 controls, at least in part, the angle between the first lever 30 and second lever 40 which, in turn, controls, at least in part, the rotating leverage and coil tension on the shock absorber 20. In accordance with other embodiments, the shock absorber second end 24 may be coupled to one of the plurality of first lever mounting points 36 suitable for a particular purpose In accordance with a method of installation of the dual-lever compression system 10, after the shock absorber 20, the first lever 30, and the second lever 40 are coupled together, the second lever 40 is extended at a desired rotational leverage angle with respect to the loading structure 61, with the second lever second end 44 pivotally coupled thereto. The first lever 30 is extended in a direction away from the second lever 40 at a desired rotational leverage angle with respect to the fender frame 54.

Upon impact to the wheel 72, the first lever 30 and second lever 40 spearhead with a linear rotational force toward the shock absorber second end 24, compressing the shock absorber 20. The adjustment of leverage angles and rotational torque of the first lever 30 and second lever 40 by selectively positioning the mounting of the first lever second end 34 and the second lever second end 44 to their respective couplings produces one of a plurality of shock absorption performance characteristics which will be discussed further below.

Referring again to FIG. 2, in accordance with embodiments of the dual-lever compression system 10, as the dual-lever compression system 10 collapses between the wheel 72 to the vehicle frame 51, the first lever 30 and second lever 40 tilt in rotational motion increasing leverage and lever force inwardly resulting in a substantially linear coil resistance by the shock absorber 20. Therefore, a controlled compression results. Further, the shock absorber travel of the shock absorber 20 is less than the shock absorber travel of a direct impact compression system which provides for maintaining the shock absorber 20 movement within the shock absorber travel "sweet zone" between being uncompressed, as shown in FIG. 5A and being fully compressed, as shown in FIG. 5B.

FIGS. 5A and 5B are side views of a shock absorber 20 as is known in the art. In shock systems that have the shock absorber 20 coupled directly to the frame 50 and loading structure 61, herein referred to as a direct impact shock system, compression of the shock absorber 20 creates a soft lag at the beginning point of coil impact and compression kickback loading when the coil spring 26 is near or at full collapse. In accordance with embodiments of the dual-lever compression system 10 having a first lever 30 and second lever 40 as provided in the embodiment of FIG. 1, the first lever 30 and second lever 40 stabilizes the compression of the shock absorber 20 and remedies lag and load dysfunction by dispersing coil spring force into leverage angles of the first lever 30 and second lever 40.

In accordance with embodiments of the dual-lever compression system 10, impact response and recoil tension of the shock absorber 20 may be adjusted suitable for a particular purpose. The angles between the first lever 30 and second lever 40 relative to the elements to which they are coupled produce a plurality of variations of suspension tension. Linear tension control of shock absorption compression and recoil substantially increases suspension impact response and recoil return, for example, not limited to, and for particular embodiments, of approximately one-third to twice that of direct impact shock systems. The first lever 30 and second lever 40 orientations with respect to their corresponding mounting structures have the capability, for example, not limited to, and for particular embodiments, of approximately to double or triple suspension travel in ratio to shock absorber travel.

By way of example, but not limited thereto, a 4 inch shock absorber travel with a 4 inch long first lever 30 and a 4 inch long second lever 40, measured at the mounting points, will produce an 8 inch suspension travel. The scissor action of the first lever 30 and the second lever 40, and the length of the first lever 30 and second lever 40 being equal, creates a 2:1 ratio of suspension travel to shock absorber travel. Contrast this with a direct impact compression system where the ratio of shock absorber travel to suspension travel is 1:1.

In accordance with embodiments of the dual-lever compression system 10, suspension travel may be more than three times the shock absorber travel. The length, position, and angles of the first lever 30 and the second lever 40 determine, at least in part, the suspension travel, shown in FIG. 1 as the distance between the wheel 72 and the fender frame 54, in regards to the shock absorber travel. The long rotational tilt strokes of the first lever 30 and second lever 40, along with leverage distribution, allows for a large ratio of suspension travel to shock absorber travel.

The dual-lever compression system 10 substantially increases vehicle suspension and motion stability. For vehicles, the lagging property of a direct impact shock system allows for the vehicle frame 51 to sway and shutter on less than perfect travel surfaces. The position and distribution of compression impact forces on the first lever 30 and second lever 40 of embodiments of the dual-lever compression system 10 dramatically stiffens suspension tension in the beginning stages of compression which eliminates unwanted vehicle swaying, pitch, and shutter. The weaker unstable starting point of coil compression of the direct impact shock system is removed by the angled leverage control of the first lever 30 and second lever 40. The vehicle weight and weaker impact forces are absorbed into the first lever 30 and second lever 40, wheels 72, vehicle frame 51, and leveraged enhanced coil compression of the shock absorber 20.

With the dual-lever compression system 10, impact compression and recoil force is distributed in a triangular matrix instead of the aggressive bilateral jarring of force created by impact and recoil of a direct impact shock system. As shown in FIG. 2, the first lever 30 directs the force upward and inward upon impact and recoil, while the second lever 40 distributes the impact and recoil force downward and inward. The completed triangular dispersion of force is directed inward to the vehicle frame 51 at the mounting point of the shock absorber first end 22. Impact and recoil force dispersed in three directions in the dual-lever compression system 10 reduces the lateral compression and recoil jarring as compared with direct impact shock systems, when, in the example of vehicles, the vehicle is traveling in rough terrain.

Referring again to FIG. 1, an embodiment of the dual-lever compression system 10 is coupled to a vehicle frame 51 and swing-arm 60 to a wheel 72. The shock absorber 20 is shown mounted horizontally pivotally coupled to the vehicle frame 51 at the shock absorber first end 22. The first lever first end 32 of the first lever 30 is pivotally coupled to the shock absorber second end 24 and the first lever second end 34 is pivotally coupled to the fender frame 54. The second lever first end 42 is pivotally coupled to the shock absorber second end 24 and the second lever second end 44 is coupled to the swing-arm 60 that itself is pivotally coupled to the vehicle frame 51 and the wheel 72 on opposite ends. The first lever 30 and second lever 40 are mounted at an angle to the axis X of the shock absorber 20. Force impacts on the wheel 72 moves the swing-arm 60, and thus the second lever second end 44 toward the first lever second end 34 and creates a leveraged spearhead compression at the shock absorber second end 24. The change in the distance between the second lever second end 44 and the first lever second end 34 is referred to as the vertical travel, which is generally the suspension travel as defined earlier. Again, shock absorber travel generally refers to the change in length of the shock absorber 20.

FIG. 2 is a side view of the embodiment of FIG. 1 showing the dual-lever compression system 10 under load. Force tension is dispersed according to, at least in part, by the lever angles. Changing lever connection points and rotational angles may create linear control of vertical travel and shock absorber travel, producing a smooth start to finish suspension compression. Direct impact shock system weakness and compression overload are eliminated by the first lever 30 and second lever 40. The first lever 30 and second lever 40 may control the amount of exertion applied to the coil spring 26 of the shock absorber 20. With direct impact shock systems, when the shock absorber 20 is at or near full compression, the shock absorber 20 builds excessive coil and compression tension which is referred to as loading, as shown in FIG. 5B. Loading strongly diminishes the ability of the shock absorber 20 absorb larger impacts properly, while producing violent kick-back forces against the vehicle frame 51. With embodiments of the dual-lever compression system 10 provided herein, the first lever 30 and second lever 40 displace leverage at precise rotational angles and absorb excessive compression loading tension, whereby eliminating or controlling loading.

The dual-lever compression system 10 provides a substantial increase in the vehicle suspension and motion stability in regards to the cornering and the braking capabilities, as well as lesser impact forces are some of the benefits of the dual-lever compression system 10s in accordance with embodiments herein.

The first lever 30 and second lever 40 increase suspension impact absorption response and recoil return. Performance is significantly improved over that of a direct impact shock system. High performance is achieved by controlling the ratio of shock absorber travel to suspension travel, as shown in FIG. 2. Embodiments of the dual-lever compression system 10 may be configured such that suspension travel is approximately twice or more the distance of the shock absorber travel.

Torsion as transmitted by the first lever 30 and second lever 40 helps to keep the coil spring 26 at an optimum compression rate and resistance.

The dual-lever compression system 10 provides that impact compression and recoil forces are distributed in a triangular matrix. The first lever 30 and second lever 40 distribute impact and recoil forces tri-laterally or spherically depending on the frame 50 and swing-arm 60 motion. The first lever 30 and second lever 40 substantially reduce bilateral jarring by distributing suspension impact and return force in a rotational semi-circle manner, as shown in FIG. 4.

By way of example, and not limited thereto, FIGS. 6-14 present side views of various embodiments of the dual-lever compression system 10. For simplicity, but not to be limiting, all of the FIGS. 6-14 depict a generally horizontal shock absorber mounting, a fender frame 54 above, and a swing-arm 60 below.

Figure 6:
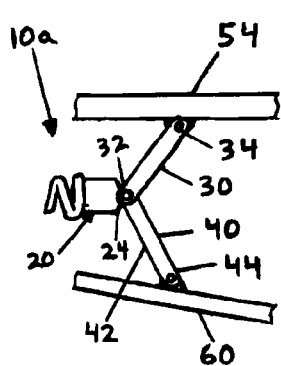
FIG. 6 is a side view of another dual-lever compression system in accordance with an embodiment.

FIG. 6 is a side view of a dual-lever compression system 10*a* in accordance with the embodiment of FIG. 1. The first lever first end 32 and the second lever first end 42 are pivotally coupled at generally the same location on the shock absorber second end 24. The first lever second end 34 and the second lever second end 44 are pivotally coupled at a single mounting point on the fender frame 54 and swing-arm 60, respectively.

Figure 7:
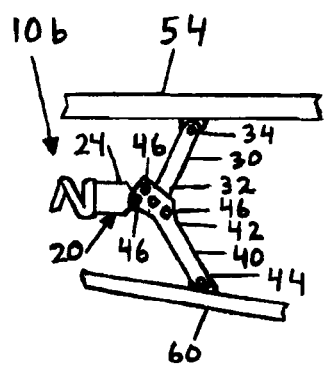
FIG. 7 is a side view of another dual-lever compression system in accordance with an embodiment.

FIG. 7 is a side view of a dual-lever compression system 10*b* in accordance with another embodiment. The second lever first end 42 further comprises a plurality of second lever mounting points 46 operable for pivotally coupling with the shock absorber second end 24 and the first lever first end 32. A plurality of second lever mounting points 46 provides options for adjusting the dual-lever compression system 10*b* for structural and performance characteristics, among other things. The first lever first end 32 is pivotally coupled to one of the second lever mounting points 46. The second lever first end 42 is pivotally coupled to one of the second lever mounting points 46. The first lever second end 34 and the second lever second end 44 are pivotally coupled at a single mounting point on the fender frame and swing-arm, respectively.

Figure 8:
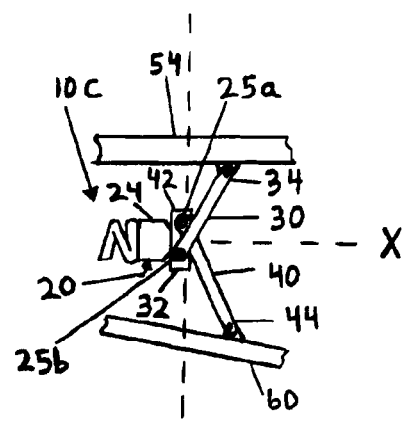
FIG. 8 is a side view of another dual-lever compression system in accordance with an embodiment.

FIG. 8 is a side view of a dual-lever compression system 10*c* in accordance with another embodiment. The shock absorber second end 24 comprises a first shock mounting point 25*a* and a second shock mounting point 25*b* along an axis perpendicular to the shock absorber 20 axis. The first lever first end 32 is pivotally coupled to the second shock mounting point 25*b* and the second lever first end 42 is pivotally coupled to the first shock mounting point 25*a* on the shock absorber second end 24. The first lever first end 32 and the second lever first end 42 cross over each other to couple on opposite sides of the shock absorber second end 24. It is appreciated that in other embodiments, the first lever first end 32 and the second lever first are coupled to the first shock mounting point 25*a* and a second shock mounting point 25*b*, respectively.

FIG. 9 is a side view of a dual-lever compression system 10*d* in accordance with another embodiment. The shock absorber second end 24 comprises a sliding sleeve 29 that is operable to move along the axis of the shock absorber 20. The first lever first end 32 and the second lever first end 42 are pivotally coupled at generally the same location on the sliding sleeve 29. The first lever second end 34 and the second lever second end 44 are pivotally coupled at a single mounting point on the fender frame 54 and swing-arm 60, respectively.

FIG. 10 is a side view of a dual-lever compression system 10*d* in accordance with the embodiment of FIG. 9, wherein the first lever 30 and second lever 40 are in an initial position defining substantially a T-shape, as compared with a Y-shape of FIG. 9. As the angle of the first lever 30 and second lever 40 approach 90 degrees to the shock absorber axis X, the performance of the dual-lever compression system 10 becomes more firm; that is, resistant to compression. Such performance may be suitable for heavy-duty applications.

FIG. 11 is a side view of a dual-lever compression system 10*e* in accordance with another embodiment. The first lever first end 32 further comprises a plurality of first lever mounting points 36 operable for pivotally coupling with the shock absorber second end 24 and the second lever first end 42. The second lever first end 42 further comprises a plurality of second lever mounting points 46 operable for pivotally coupling with the shock absorber second end 24 and the first lever first end 32. A plurality of first lever mounting points 36 and second lever mounting points 46 provide options for adjusting the dual-lever compression system 10 for structural and performance characteristics, among other things. The first lever first end 32 is pivotally coupled to one of the second lever mounting points 46. The second lever first end 42 is pivotally coupled to one of the first lever mounting points 36. The shock absorber second end 24 is pivotally coupled to one or both of a first lever mounting points 36 and second lever mounting points 46. The first lever second end 34 and the second lever second end 44 are pivotally coupled at a single mounting point on the fender frame 54 and swing-arm 60, respectively.

FIG. 12 is a side view of a dual-lever compression system 10*f* in accordance with another embodiment. The first lever first end 32 and the second lever first end 42 are pivotally coupled at generally the same location on the shock absorber second end 24. The fender frame 54 comprises a plurality of fender mounting points 55 operable for pivotally coupling with the first lever second end 34. The swing-arm 60 comprises a plurality of swing-arm mounting points 65 operable for pivotally coupling with the second lever second end 44.

The first lever second end 34 and the second lever second end 44 are pivotally coupled at one of the fender mounting points 55 and swing-arm mounting points 65, respectively.

FIG. 13 is a side view of a dual-lever compression system 10g in accordance with another embodiment. The shock absorber second end 24 comprises a first shock mounting point 25a and a second shock mounting point 25b along an axis perpendicular to the shock absorber axis X. The distance between the first shock mounting point 25a and the second shock mounting point 25b is relatively larger than the embodiment of FIG. 10. The first lever first end 32 is pivotally coupled to the second shock mounting point 25b and the second lever first end 42 is pivotally coupled to the first shock mounting point 25a on the shock absorber second end 24. The first lever first end 32 and the second lever first end 42 cross over each other to couple on opposite sides of the shock absorber second end 24. It is appreciated that in other embodiments, the first lever first end 32 and the second lever first are coupled to the first shock mounting point 25a and the second shock mounting point 25b, respectively.

FIG. 14 is a side view of a dual-lever compression system 10h in accordance with another embodiment. The first lever first end 32 further comprises a plurality of first lever mounting points 36 operable for pivotally coupling with the second lever first end 42. The second lever first end 42 further comprises a plurality of second lever mounting points 46 operable for pivotally coupling with the shock absorber second end 24 and the first lever first end 32. A plurality of first lever mounting points 36 and second lever mounting points 46 provide options for adjusting the dual-lever compression system 10 for structural and performance characteristics, among other things. The first lever first end 32 is pivotally coupled to one of the second lever mounting points 46. The second lever first end 42 is pivotally coupled to one of the first lever mounting points 36. The first lever second end 34 and the second lever second end 44 are pivotally coupled at a single mounting point on the fender frame 54 and swing-arm 60, respectively.

The compression performance control provided by embodiments of the dual-lever compression system 10 is directly related to the incorporation of dual levers coupled to the shock absorber 20; that is, the first lever 30 and the second lever 40. Angles, position, and pivotal rotations of the dual levers provide for controlled shock absorption. Compression performance of two connecting points between the rigid frame regions where by a first lever 30 pivotally couples to one point of a frame 50 and pivotally couples to the impact point of the shock absorber 20, which is the shock absorber second end 24, with the base mount of the shock absorber 20 pivotally coupled to a second point of the frame 50. The second lever 40 completes the system, where a second lever first end 42 of the second lever 40 is pivotally coupled to the first lever 30 or the shock absorber impact point, which is the shock absorber second end 24. A second end of the second lever 40 is pivotally coupled to a swing-arm 60 or wheel 72 region. The dual lever assembly manipulates the shock absorber force tension which in return produces increased suspension performance.

Figure 15A:
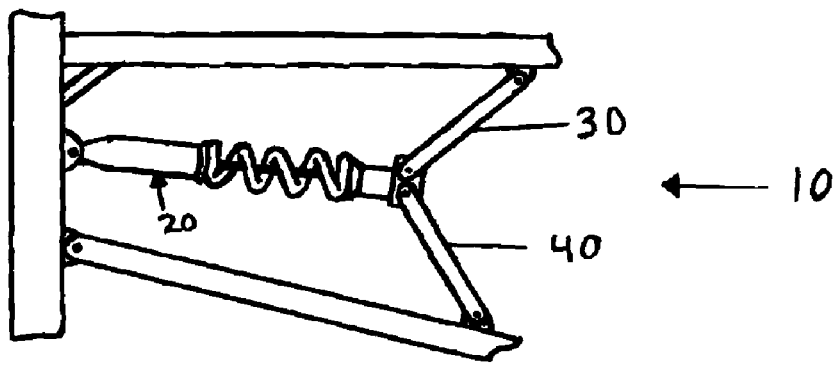
FIG. 15A-15C are side views of a dual-lever compression system in accordance with an embodiment.
Figure 15B:
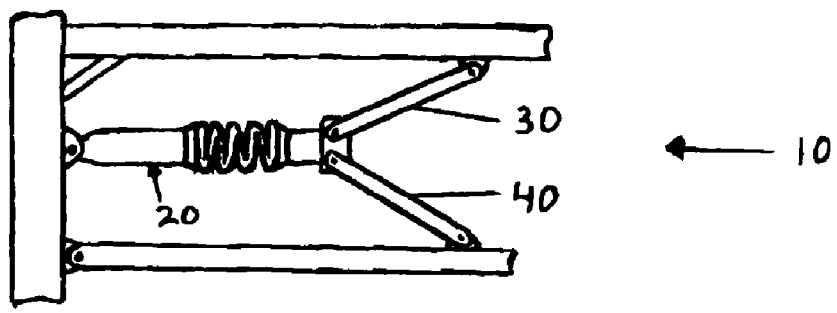
Figure 15C:
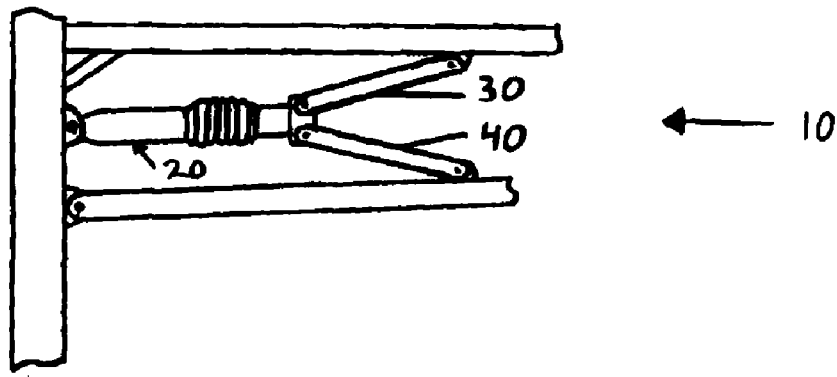

FIG. 15A is a side a dual-lever compression system 10 comprising a compression shock absorber 20, a first lever 30, and a second lever 40, in accordance with an embodiment showing the dual-lever compression system 10 under relatively light load. FIG. 15B is a side a dual-lever compression system 10 in accordance with the embodiment of FIG. 15A, showing the dual-lever compression system 10 under relatively moderate load where impact forces on the suspension are converted to optimum midrange shock absorbing quality. FIG. 15C is a side a dual-lever compression system 10 in accordance with the embodiment of FIG. 15A, showing the dual-lever compression system 10 under relatively extreme compression wherein further compression is restricted preventing suspension collapse.

Figure 16:
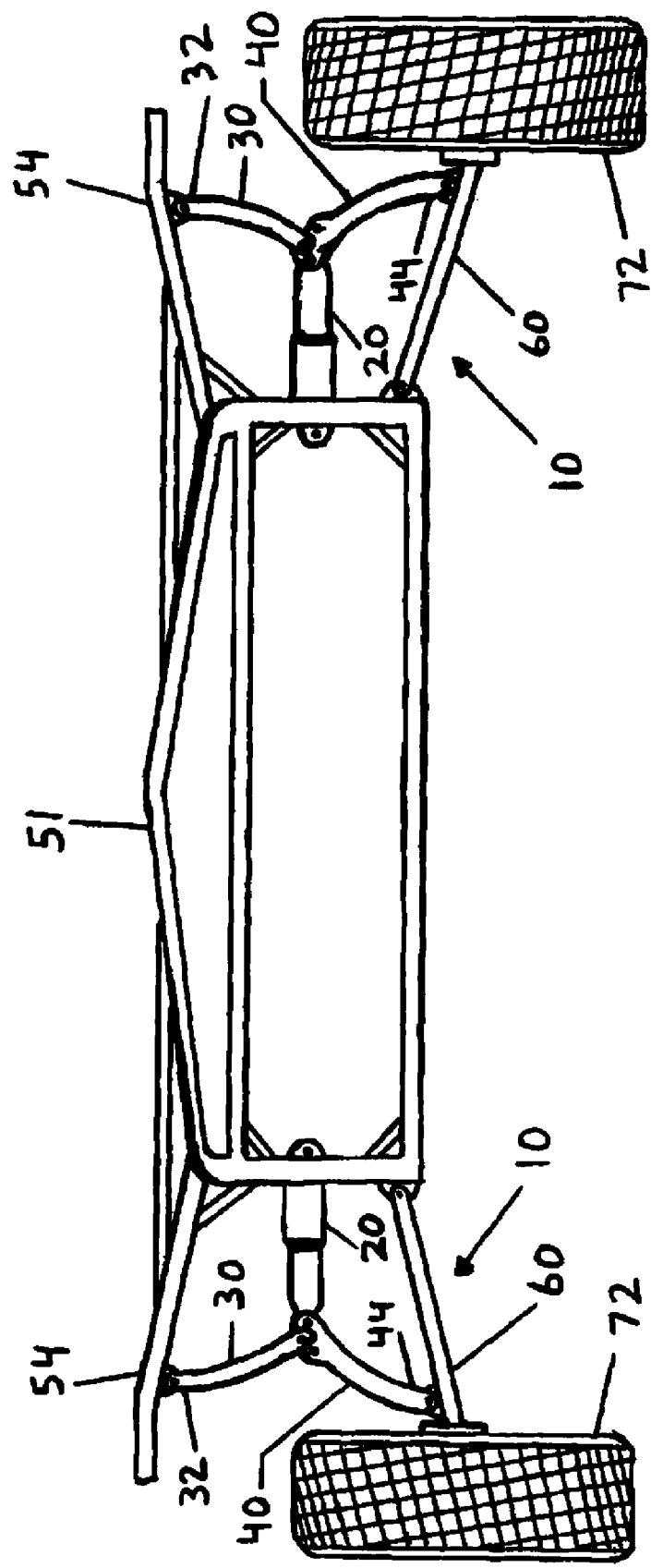
FIG. 16 is a front view of another dual-lever compression system as coupled to a vehicle frame, in accordance with an embodiment.

FIG. 16 is a front view of an embodiment of the dual-lever compression system 10 as assembled on a vehicle frame 51. Three point connection parameters provided by embodiments of the dual-lever compression system 10 present a triangular distribution of force. The three point mount design distributes the impact forces approximately ⅓ inward to the vehicle frame 51 horizontally and/or angularly, ⅓ in a semi spherical rotational impact force upward and outward from vehicle frame 51, and ⅓ semi spherical rotational impact force downward and outward from vehicle frame 51. Strategic mounting area of shock absorber 20 and first lever 30 and second lever 40 are in the confines of the outer or inner vehicle frame 51, the pivotal lever mounting points at or near the fender frame 54 and/or the first internal and external frame regions. The second lever second end 44 is coupled to the swing-arm 60 adjacent the wheel 72.

Suspension impact and recoil forces are distributed into and out of the shock absorber 20 by the rotating angular motion of the first lever 30 and second lever 40, producing a spear head compression motion the position of angle degree or pitch of the first lever 30 and second lever 40 stabilize weak unstable suspension motion. Rotational leverage of first lever 30 and second lever 40 distributes impact and recoil forces away from shock absorbers primary compression weakness or lag region, increasing the shock tension performance. Suspension motion instabilities on smooth and moderate surfaces are substantially decreased. Compression control eliminates the majority of vehicle sway, listing, and frame shutter during cornering, braking, and road surface variations.

Figure 17:
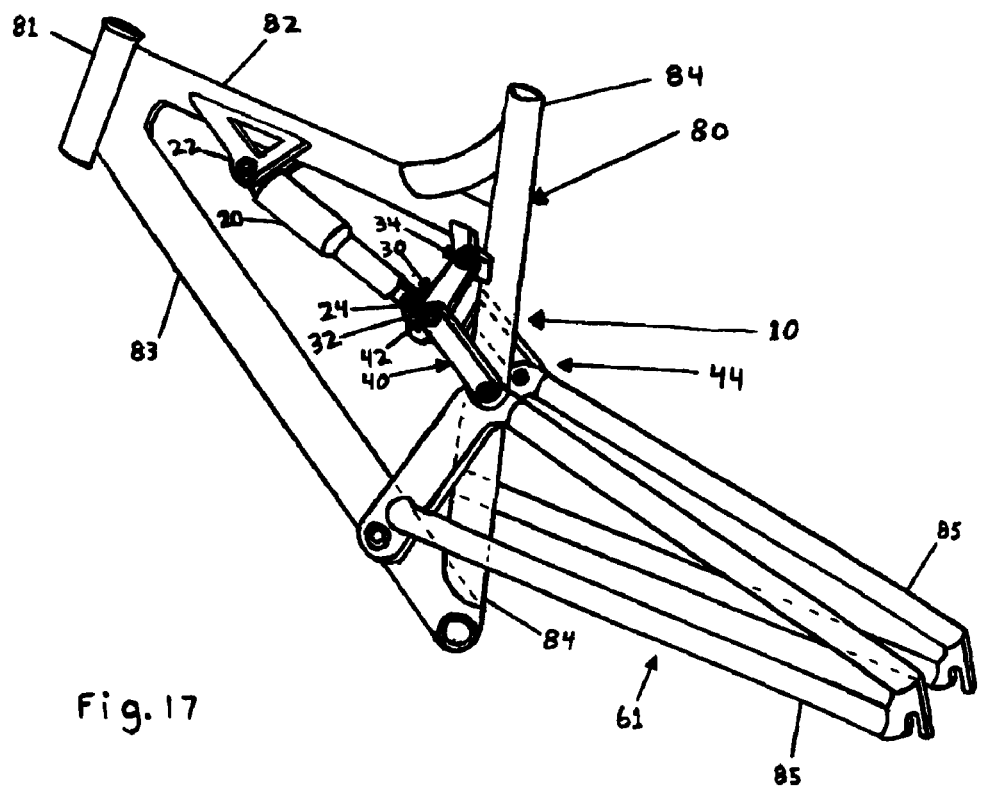
FIG. 17 is a perspective view of a dual-lever compression system in accordance with an embodiment as coupled to a frame of a bicycle.

FIG. 17 is a side view of a dual-lever compression system 10 in accordance with an embodiment as coupled to a bicycle frame 80. The application of the dual-lever compression system 10 to a bicycle frame 80 is substantially the same as that of an automobile as shown in FIG. 1. The bicycle frame 80 comprises a head tube 81 that defines the front of the bicycle. The head tube 81 is the coupling point for the handle bars (not shown) and the front fork (not shown) that couples to the front wheel. Extending from the head tube 81 in a generally horizontal orientation is the cross-bar 82 which connects the top of the head tube 81 to a top of a seat tube 84. Extending and sloping down from the head tube 81 is a down tube 83 that connects the head tube 81 to a lower end of the seat tube 84. The seat tube 84 is the coupling point for the saddle (not shown) at the top end and the pedals (not shown) at the bottom end. A pair of chain stays 85 is pivotally coupled to the down tube 83 at one end and to either side of a rear wheel (not shown) at the opposite end. In the embodiment of FIG. 17, suspension of the rear wheel is desired.

The dual-lever compression system 10 comprises a compression shock absorber 20, a pair of first levers 30, and a pair of second levers 40. The compression shock absorber 20 includes a shock absorber first end 22 and a shock absorber second end 24 opposite the shock absorber first end 22. Each of the pair of first levers 30 is an elongated element comprising a first lever first end 32 and a first lever second end 34 opposite the first lever first end 32. Each of the pair of second levers 40 is an elongated element comprising a second lever first end 42 and a second lever second end 44 opposite the second lever first end 42. Either of both of the first levers 30 and second levers 40 may be straight, arc-shaped, or otherwise non-straight, suitable for a particular purpose.

The shock absorber first end 22 is pivotally coupled to the cross-bar 82 at a mid-point between the head tube 81 and the seat tube 84. Each of the pair of first lever first ends 32 are pivotally coupled to the shock absorber second end 24, and each of the pair of first lever second ends 34 is pivotally coupled to the cross-bar 82 adjacent the seat tube 84. Each of the pair of second lever first ends 42 are pivotally coupled to the shock absorber second end 24, and each of the pair of second lever second ends 44 are pivotally coupled to one of the pair of chain stays 85. The pair of chain stays 85 is the loading structure 61 and is analogous to the swing-arm 60 of the embodiment of FIG. 1

Figure 18:
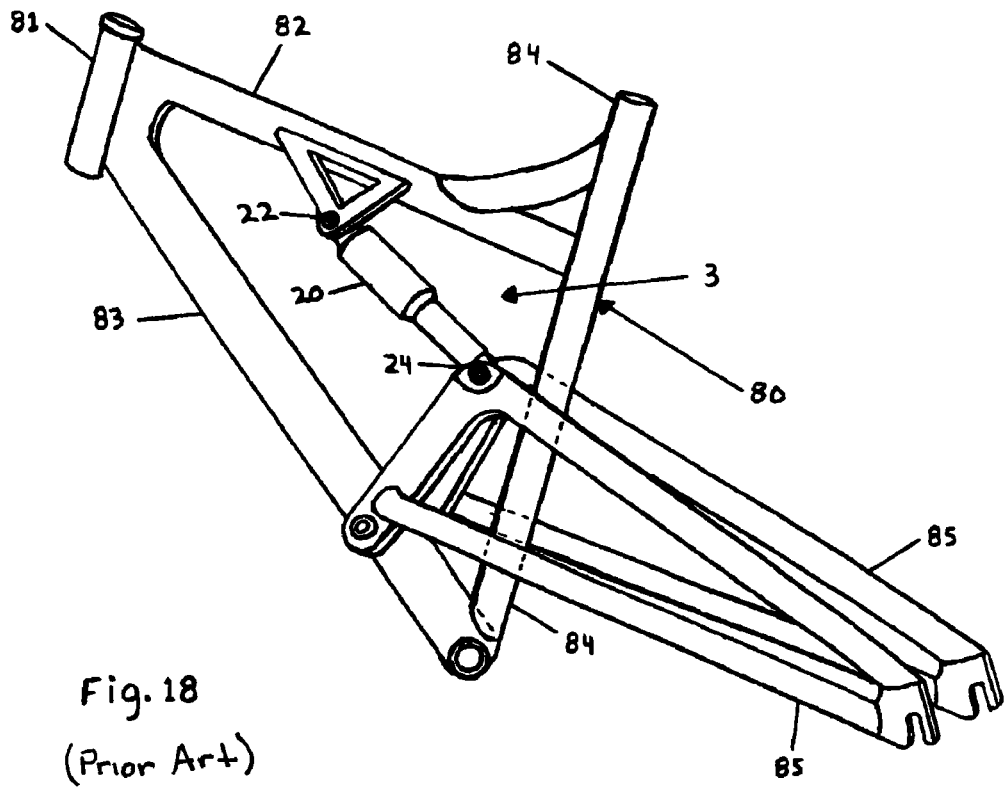
FIG. 18 is a perspective view of a direct impact compression system in accordance with known art as coupled to a frame of a bicycle

The dual-lever compression system 10 as coupled to a bicycle frame 80 performs in substantially the same way with substantially the same performance benefits as was described for the previous embodiments of the dual-lever compression system 10 as coupled to an automobile. Known bicycle suspension systems, as shown in FIG. 18, where the shock absorber second end 24 is directly coupled to the pair of chain stays 85, that is, a direct impact compression system 3, exhibits substantially the same performance limitations as previously discussed, such as, but not limited to, soft lag at the beginning point of coil impact, and compression kickback loading when the coil spring 26 is near or at full collapse. With the dual-lever compression system 10 coupled to a bicycle frame 80, the pair of first levers 30 and the pair of second levers 40 stabilize the compression of the shock absorber 20 and substantially reduce lag and load dysfunction by, in part, dispersing coil spring 26 force into leverage angles of the first levers 30 and second levers 40.

While there has been illustrated and described what are presently considered to be example embodiments, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular embodiments disclosed, but that such claimed subject matter may also include all embodiments falling within the scope of the appended claims, and equivalents thereof.

What is claimed is:

1. A dual-lever compression system comprising:
    a shock absorber including a shock absorber first end and a shock absorber second end opposite the shock absorber first end;
    a first lever; and
    a second lever, the shock absorber first end being operable to be pivotally coupled to a frame, the shock absorber second end being operable to be pivotally coupled to the first lever and the second lever, the first lever being operable to be pivotally coupled to the frame, and the second lever being operable to be pivotally coupled to a loading structure.

2. The dual-lever compression system of claim 1, wherein the
    the first lever is an elongated element comprising a first lever first end and a first lever second end opposite the first lever first end, the second lever is an elongated element comprising a second lever first end and a second lever second end opposite the second lever first end, the first lever first end is pivotally coupled to the shock absorber second end and the first lever second end is operable to be pivotally coupled to the frame, the second lever first end is pivotally coupled to the shock absorber second end and the second lever second end is operable to be pivotally coupled to the loading structure, the first lever and the second lever as coupled to the shock absorber define generally a Y-shape.

3. The dual-lever compression system of claim 2, further comprising:
    a plurality of first levers; and
    a plurality of second levers, wherein the plurality of first levers are pivotally coupled to the shock absorber second end and operable to be coupled to a frame, and the plurality of second levers are pivotally coupled to the shock absorber second end and operable to be coupled to a loading structure.

4. A dual-lever compression system for a vehicle, the vehicle including a frame and a swing-arm, comprising:
    a shock absorber including a shock absorber first end and a shock absorber second end opposite the shock absorber first end;
    a first lever; and
    a second lever, the shock absorber first end being operable to be pivotally coupled to the frame, the shock absorber second end being operable to be pivotally coupled to the first lever and the second lever, the first lever being operable to be pivotally coupled to the frame, and the second lever being operable to be pivotally coupled to the swing-arm.

5. The dual-lever compression system of claim 4, wherein the first lever is an elongated element comprising a first lever first end and a first lever second end opposite the first lever first end, the second lever is an elongated element comprising a second lever first end and a second lever second end opposite the second lever first end, the first lever first end is pivotally coupled to the shock absorber second end and the first lever second end is operable to be pivotally coupled to the frame, the second lever first end is pivotally coupled to the shock absorber second end and the second lever second end is operable to be pivotally coupled to the swing-arm, the first lever and the second lever as coupled to the shock absorber define generally a Y-shape.

6. The dual-lever compression system of claim 5, further comprising:
    a plurality of first levers; and
    a plurality of second levers, wherein the plurality of first levers are pivotally coupled to the shock absorber second end and operable to be coupled to the frame, and the plurality of second levers are pivotally coupled to the shock absorber second end and operable to be coupled to the swing-arm.

7. A dual-lever compression system for a bicycle frame, the bicycle frame comprising a head tube that defines the front of the bicycle, extending from the head tube in a generally horizontal orientation is a cross-bar which connects the top of the head tube to a top of a seat tube, extending and sloping down from the head tube is a down tube that connects the head tube to a lower end of the seat tube, a pair of chain stays being pivotally coupled to the down tube at one end, and a swing-arm, dual-lever compression system comprising:
    a compression shock absorber;
    a pair of first levers; and
    a pair of second levers, the compression shock absorber includes a shock absorber first end and a shock absorber second end opposite the shock absorber first end, each of the pair of first levers is an elongated element comprising a first lever first end and a first lever second end opposite the first lever first end, each of the pair of second levers is an elongated element comprising a second lever first end and a second lever second end opposite the second lever first end, the shock absorber first end is pivotally coupled to the cross-bar at a mid-point between the head tube and the seat tube, each of the pair of first lever first ends are pivotally coupled to the shock absorber second end, and each of the pair of first lever second ends is pivotally coupled to the cross-bar adjacent the seat tube, each of the pair of second lever first ends are pivotally coupled to the shock absorber second end, and each of the pair of second lever second ends are pivotally coupled to one of the pair of chain stays, the pair of first levers and the pair of second levers as coupled to the shock absorber define generally a Y-shape.

8. The dual-lever compression system of claim 1, wherein the first lever is an elongated element comprising a first lever first end and a first lever second end opposite the first lever first end, the second lever is an elongated element comprising a second lever first end and a second lever second end opposite the second lever first end, the first lever first end is pivotally coupled to the second lever and the first lever second end is operable to be pivotally coupled to the frame, the second lever first end is pivotally coupled to the shock absorber second end and the second lever second end is operable to be pivotally coupled to the loading structure.

9. The dual-lever compression system of claim 8, wherein the second lever comprises a plurality of second lever mounting points, each of the plurality of second lever mounting points being operable for pivotally coupling to the first lever second end.

10. The dual-lever compression system of claim 1, wherein the first lever is an elongated element comprising a first lever first end and a first lever second end opposite the first lever first end, the second lever is an elongated element comprising a second lever first end and a second lever second end opposite the second lever first end, the first lever first end is pivotally coupled to the shock absorber second end and the first lever second end is operable to be pivotally coupled to the frame, the second lever first end is pivotally coupled to the first lever and the second lever second end is operable to be pivotally coupled to the loading structure.

11. The dual-lever compression system of claim 10, wherein the first lever comprises a plurality of first lever mounting points, each of the plurality of first lever mounting points being operable for pivotally coupling to the second lever first end.

12. The dual-lever compression system of claim 4, wherein the first lever is an elongated element comprising a first lever first end and a first lever second end opposite the first lever first end, the second lever is an elongated element comprising a second lever first end and a second lever second end opposite the second lever first end, the first lever first end is pivotally coupled to the second lever and the first lever second end is operable to be pivotally coupled to the frame, the second lever first end is pivotally coupled to the shock absorber second end and the second lever second end is operable to be pivotally coupled to the loading structure.

13. The dual-lever compression system of claim 12, wherein the second lever comprises a plurality of second lever mounting points, each of the plurality of second lever mounting points being operable for pivotally coupling to the first lever second end.

14. The dual-lever compression system of claim 4, wherein the first lever is an elongated element comprising a first lever first end and a first lever second end opposite the first lever first end, the second lever is an elongated element comprising a second lever first end and a second lever second end opposite the second lever first end, the first lever first end is pivotally coupled to the shock absorber second end and the first lever second end is operable to be pivotally coupled to the frame, the second lever first end is pivotally coupled to the first lever and the second lever second end is operable to be pivotally coupled to the loading structure.

15. The dual-lever compression system of claim 14, wherein the first lever comprises a plurality of first lever mounting points, each of the plurality of first lever mounting points being operable for pivotally coupling to the second lever first end.

* * * * *